April 29, 1924.

J. J. MEYER

INSERTABLE JOINT

Filed Jan. 25, 1923

1,492,522

WITNESSES
Oliver W. Holmes

INVENTOR
JOHN J. MEYER
BY Munn & Co.
ATTORNEYS

Patented Apr. 29, 1924.

1,492,522

UNITED STATES PATENT OFFICE.

JOHN J. MEYER, OF NEW YORK, N. Y.

INSERTABLE JOINT.

Application filed January 25, 1923. Serial No. 614,864.

*To all whom it may concern:*

Be it known that I, JOHN J. MEYER, a citizen of the United States, and a resident of the city of New York, borough of Manhattan, in the county and State of New York, have invented a new and Improved Insertable Joint, of which the following is a full, clear, and exact description.

This invention relates to an insertable joint for soil pipes and has for an object to provide an improved construction wherein a joint may be readily made without disturbing the upper part of a pipe or the lower part.

A further object of the invention is to provide an improved form of joint which is a division in part of my prior application, Serial No. 480,294.

A further object of the invention is to provide a joint for soil pipes and the like wherein the joint may be expansible with or without the insertion of an auxiliary member and wherein an auxiliary member when used may be inserted laterally.

Another object is to provide a method for joining two pipe sections, each having one mitered or slanted end, with a rigidly fixed pipe line to permit of easy falling together into a tubular alignment within a pipe coupling.

An additional object is to provide an insertable joint for soil pipes wherein a specially constructed hub is provided which acts in the capacity of an ordinary hub and in addition as enclosing and retaining means for inserted portions of pipes and as a connecting member for connecting the inserted section with the superimposed section.

In the accompanying drawing—

Referring to the accompanying drawing by numerals, 1 and 2 indicate the floors of a building through which a soil pipe 3 extends. The soil pipe may be of any desired height and connected in any desired manner with the various fittings of the building. Under some circumstances, it may be desired to add a new section to the soil pipe at some convenient point, as for instance, section 4 which is a branch section of pipe designed to present an auxiliary opening.

Figure 1:
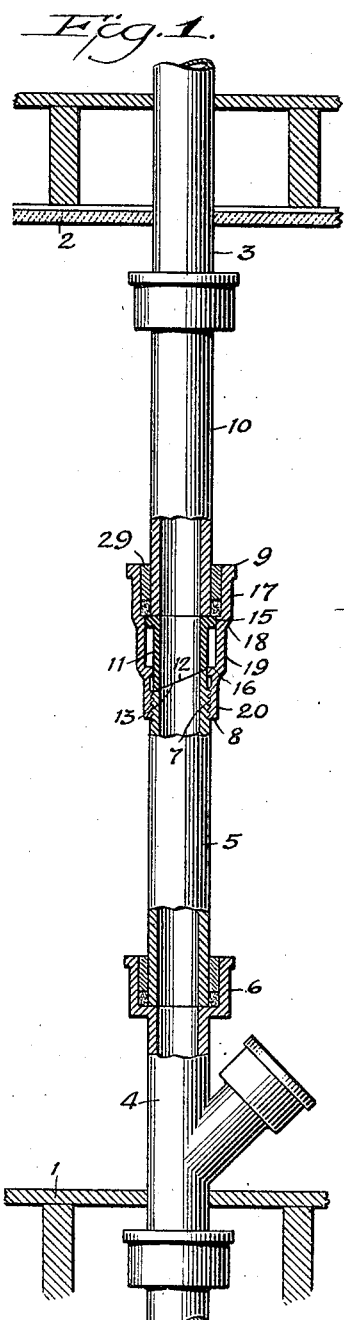
Figure 1 is a fragmentary view of a soil pipe extending through two floors of a building with certain parts broken away illustrating an embodiment of the invention.

When it is desired to put in a new section similar to section 4, it will be necessary to remove one of the sections of the soil pipe and in such removal the particular section is broken or cut. After the desired section or sections have been removed, pipe 4 is inserted as shown in Figure 1 and then an inserted joint section provided which consists of a lower section 5 of the same diameter throughout and adapted at its lower end to fit into the bell or hub 6 of section 4 while at its upper end it is provided with threads 7 for receiving the internally threaded section 8 of the bell or hub 9.

Figures 6, 7, 8:
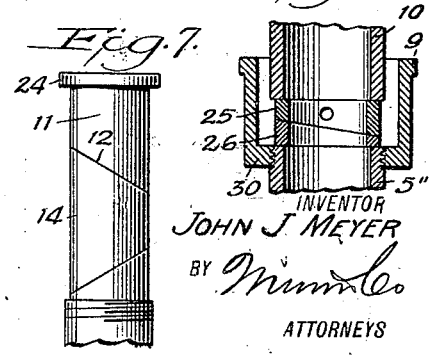
Figure 6 is a view similar to Figure 2 but showing a further modified form of the invention wherein the inserted pipe is formed of two pieces only.
Figure 7 is a view similar to Figure 6 but showing an insert or sleeve section for securing an additional expansion.
Figure 8 is a view similar to Figure 5 but showing a modified form of the invention.

It will be noted that the hub or bell 9 is provided with an upper portion 17 which is in the form of the usual bell, said upper portion merging into a thickened portion 18 which carries a shoulder 15, said thickened portion also merging into an intermediate section 19 and said intermediate section merging into a lower section 20, which lower section carries the annular flange 16 and the threaded section 8. It will be noted that the upper end of the section 5 is an appreciable distance below the lower end of the superimposed section 10. To take care of this space and at the same time provide a proper support for the section 10 and other sections above the same, a nipple or sleeve 11 is provided, which sleeve or nipple is formed with an inclined or cam bottom 12 co-acting with the slanting or inclined top 13. By this construction and arrangement, the section 5 may be placed in the bell or hub 6 and then swung over to a proper position in engagement with the nipple 11. If the distance between the section 4 and section 10 is too great to allow a contact as shown in Figure 1, the section 5 may be rotated as shown in Figure 6 to the desired extent to take up the distance. It will thus be seen that this form of the invention provides an adjustment or an expansion to take up slight difference in length and at the same time maintain a support for the superimposed pipe section. After the section 5 has been adjusted to the position shown in Figure 1 or that shown in Figure 6, the hub may be screwed into position as illustrated in Figure 1. Under some circumstances, it may be desired to add some additional spacing and supporting member and when this is the case the parts may be separated and a supporting section 14 inserted between the cam faces 24 and 25, said section being held in place by the hub 9 when it is moved down to its operative position as shown in Figure 1.

Figure 4:
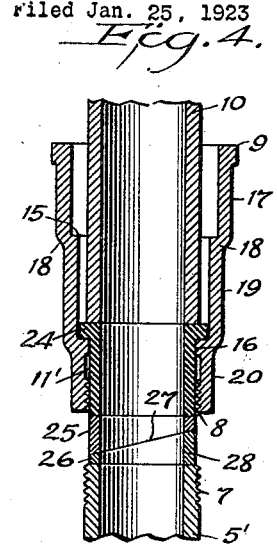
Figure 4 is a view similar to Figure 2 but showing a slightly modified form of insertable ring or sleeve.
Figure 5:
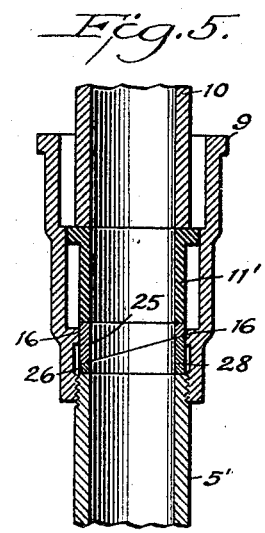
Figure 5 is a view similar to Figure 4 but showing the parts in their operative position.
Figure 2:
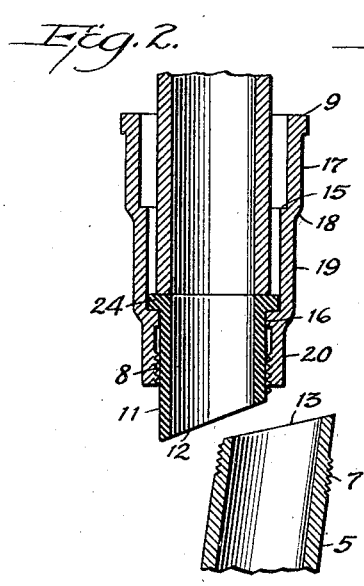
Figure 2 is an enlarged fragmentary view of the upper part of the joint shown in Figure 1, the parts being in the position immediately after insertion.
Figure 3:
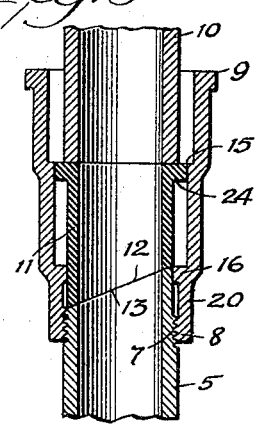
Figure 3 is a view similar to Figure 2 but showing the parts in operative position and ready for receiving the packing.

In Figures 4 and 5, a modified construction is shown wherein the nipple 11' is a tubular structure provided with a flange 24 similar to the flange of the nipple 11. The exterior diameter of the sleeve 11' is slightly less than the exterior diameter of the section 5' so that the threaded portion 8 may slide thereover. Associated with the sleeve 11' is a second sleeve structure divided into what may be termed cam sections 25 and 26. Each of these sections is provided with an inclined face 27 so that when arranged as shown in Figure 4, a substantially perfect ring structure is presented functioning as a sleeve which may be inserted laterally into position. If the distance between the section 5' and section 10 should be a little greater than the length of the sleeve structure 28 formed by the cam members 25 and 26, one or both of the sections may be rotated and thereby produce an expansion. The more that one member is rotated in respect to the other the greater will be the separation at one time but they will always remain in contact whereby a proper support for the superimposed section 10 and other sections thereabove will be provided. After the cam members 25 and 26 have been properly adjusted, the hub 9 is moved down as shown in Figure 5 and screwed into position after which the filling 29 is provided.

In Figure 8, another form of the invention is shown wherein the section 5" is identical with section 5' shown in Figure 4 but the hub 9' is arranged with a single inwardly extending flange 30 which is threaded on its interior surface so as to be screwed onto pipe 5". In this form of the invention, the cam sections 25 and 26 are used and are each made of a greater height than the thickness of the flange 30 though the outside diameter is less than the diameter of the threaded opening in the hub. It is understood that the nipples or sleeves 11, 11', 25 and 26 and the slanted end of section 5 may be slightly less in exterior diameter than the sections 5 and 10 and that cam or slanted pipe ends are mainly intended to allow the easy falling together of the pipe sections into alignment with the main pipe line. The expansion obtained by rotating the cam faced sections is also of importance and the insertion of the sleeve 28 transversely from the opposite direction to that of the main pipe line is accomplished after sections 5, 10 and 11' are in position.

What I claim is:—

1. An insertable joint, comprising a pipe section having threads near the upper end, a removable hub having a threaded portion adapted to be screwed onto said pipe section, said pipe section having a slanting upper end, and a nipple loosely positioned in said hub having a slanting end co-acting with the slanting end of said pipe section.

2. An insertable joint, comprising a pipe section having a slanting upper end, an externally threaded portion near the upper end, a hub having a threaded portion adapted to be screwed onto the threaded portion of said section, and a tubular nipple having a slanting bottom for fitting the slanting top of said section, said nipple having an annular flange at the upper end acting as a false bottom for said hub.

3. An insertable joint for soil pipes and the like, comprising two pipe sections, a pipe coupling adapted to confine one end of each of the said pipe sections within the hub in tubular alignment and to form a water tight joint, the said two pipe sections within the hub to have slanted registering faces to permit of easy falling together when being assembled.

4. An insertable joint for soil pipes and the like, comprising two pipe sections, a pipe coupling adapted to confine one end of each of said pipe sections within the hub in tubular alignment and to form a water tight joint, the said two pipe ends within the hub to have slanted registering faces to permit of easy falling together when being assembled, said pipe coupling having one end threaded on one of the said pipe sections and its other end adapted for a filler joint around the second pipe end.

5. In combination with a soil pipe line and the like having a branch outlet, an insertable joint comprising two or more sections of pipe having slanted or mitered faces to facilitate the falling together of the sections into tubular alignment, and a coupling or hub adapted to enclose the portions of the sections having the mitered or slanted faces and to form a water or gas tight joint.

6. An insertable joint, comprising a pipe section, a removable hub having the lower portion internally threaded, said pipe being externally threaded at the upper end, and a pair of cam members capable of being positioned on the upper end of said section by a lateral movement, the upper end of said section and said cam members being positioned within said hub.

7. An insertable joint, comprising a pipe section threaded at the upper end, a removable hub therefor, and a pair of cam members positioned within the hub when the hub is screwed onto said threaded section, said cam members being in the form of rings and each ring having a tapering or slanting face whereby when one ring is rotated in respect to the other they will be expanded or contracted according to the direction of rotation.

8. An insertable joint for soil pipes and the like, comprising a pipe section threaded exteriorly at one end, a removable hub formed with a threaded portion normally screwed onto the threaded portion of said section, and a combined supporting and spacing ring resting on said section, said ring being formed in two parts having registering cam faces capable of causing the distance between the opposite end of the sleeve to be varied according to the position of the sections, and to allow the pipe section to fall into position easily by reason of the slanting ends of said ring sections.

9. An insertable joint for soil pipes and the like, comprising a section having external threads adjacent one end thereof, a tubular ring divided into two parts, one part of said ring constituting one pipe end and the other part of said ring constituting a second pipe end co-acting with the first mentioned pipe end, said ring parts being formed so that their engaging faces will be on a slant to facilitate the movement into position of said pipe ends in alignment thereof, and a hub removably mounted on the externally threaded pipe end.

10. An insertable joint, comprising a pipe section having a threaded portion at one end, said end being slanting, a removable hub adapted to be screwed onto to said threaded portion, a nipple having a slanting end, and a supporting substantially wedge-shaped tubular section fitting between said nipple and the slanting end of said section, said wedge-shaped tubular section being retained in place by said hub.

11. An insertable joint comprising a pipe section, a removable hub having its lower portion internally threaded, said pipe section being externally threaded at the upper end, a pair of tubular slanted cam faced members resting on the end of the pipe section, one of the said slanted members being capable of being positioned on the upper end of the pipe section by a lateral movement, the upper end of said section and said cam faced members being positioned within said hub when permanently assembled, and a superimposed pipe having its end resting on the uppermost cam member within the hub, said cam members constituting in effect the pipe ends of the abutting pipes.

JOHN J. MEYER.